Oct. 7, 1930. J. C. EDGECUMBE 1,777,829
TOOL CLUTCH
Filed Oct. 29, 1928
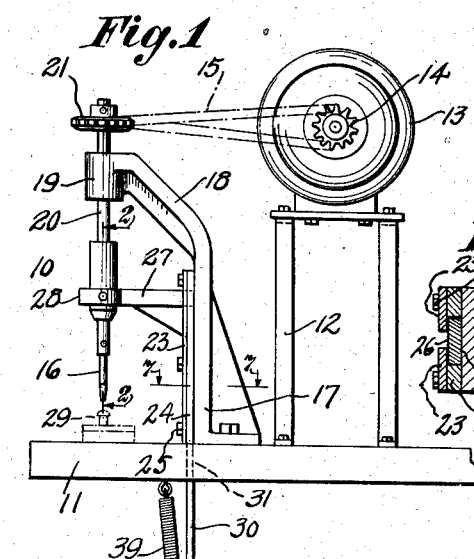
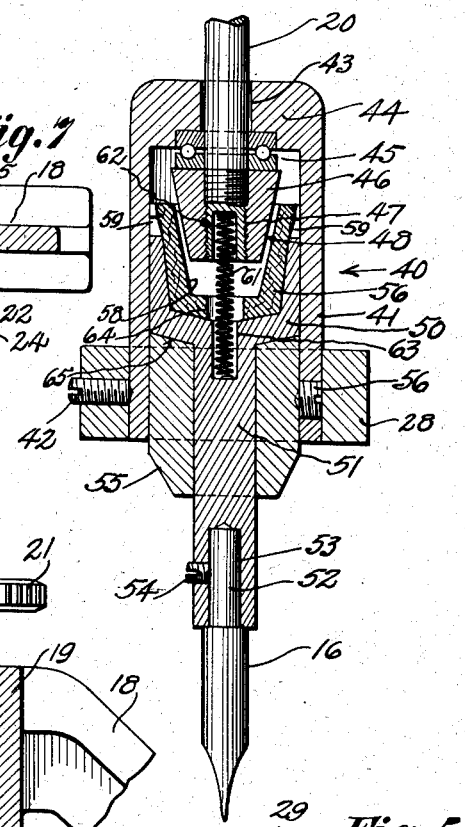
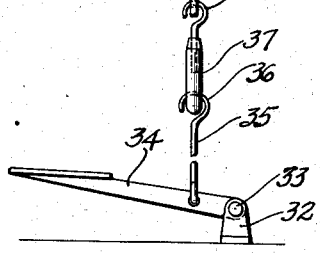
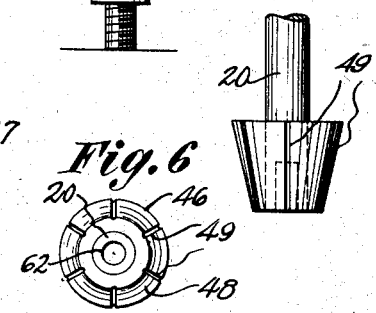
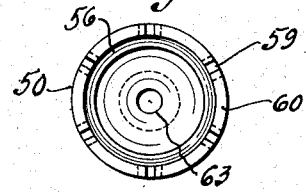
Inventor:
J. C. Edgecumbe
By his Attorneys
Beeler & Schumacher

Patented Oct. 7, 1930

1,777,829

UNITED STATES PATENT OFFICE

JOSHUA C. EDGECUMBE, OF WESTFIELD, NEW JERSEY

TOOL CLUTCH

Application filed October 29, 1928. Serial No. 315,901.

This invention relates to clutches.

One object of this invention is to provide an improved clutch which is adapted for various uses, and particularly in connection with a rotary tool, or the like.

Other objects and advantages of the invention will become apparent as the specification proceeds.

With the aforesaid objects in view, the invention consists in the novel combinations and arrangements of parts hereinafter described in their preferred embodiments, pointed out in the subjoined claim, and illustrated on the annexed drawing, wherein like parts are designated by the same reference characters throughout the several views.

In the drawing:

Figure 1 is a view in side elevation of a machine embodying the invention.

Fig. 2 is an enlarged view in vertical section of the same taken on the line 2—2 of Fig. 1.

Fig. 3 is an outside fragmentary view of a clutch member.

Fig. 4 is a top view of the same.

Fig. 5 is a view in elevation of the male member of the clutch.

Fig. 6 is a bottom plan view thereof.

Fig. 7 is an enlarged sectional view taken on the line 7—7 of Fig. 1.

Fig. 8 is an enlarged fragmentary view of the device showing the bearing in section.

The advantages of the invention as here outlined are best realized when all of its features and instrumentalities are combined in one and the same structure, but, useful devices may be produced embodying less than the whole.

It will be obvious to those skilled in the art to which the invention appertains, that the same may be incorporated in several different constructions. The accompanying drawing, therefore, is submitted as showing the preferred exemplification of the invention.

Referring in detail to the drawing, 10 denotes a device embodying the invention. The same includes a table 11 upon which is mounted a base 12 for supporting a motor 13. The latter is of any well known type and includes a small sprocket wheel 14 for operating a sprocket chain 15 that drives the screw driver 16. A bracket 17 secured to the table 11 in upstanding relation includes a laterally extending arm 18 which terminates in a hub 19 in which the spindle 20 is journaled in vertically slidable relation therein. The said spindle 20 has fixed at the upper end thereof a sprocket wheel 21 with the teeth of which the sprocket chain 15 meshes. Formed on the bracket 17 is a vertical guideway 22 which is constructed by securing to the bracket a plurality of spaced plates 23 between which and the bracket are interposed the narrow strips 24. Securing the parts 23 and 24 to the bracket are screws 25 or the like. Mounted for vertical reciprocation in the guideway 22 is a bracket 26 having a laterally extending arm 27 which is formed at its end with a hub 28 and which serves to move the tool 16 downward into co-operation with a screw 29 by means more particularly to be described hereinafter. The bracket 26 has an elongated portion 30 which extends through an opening 31 in the table 11. Mounted on the floor or other stationary part is a bracket 32 upon which is pivotally mounted at 33 a foot operated lever 34. Coacting with the lever 34 is a tension member 35 having a hook 36 to engage a member 37 in the upper end of which a hook 38 has adjustable screw threaded engagement. The hook 38 is connected with the portion 30, whereby on depressing the lever 34 a downward movement is imparted to the bracket 26. Automatically returning the bracket 26 to initial raised position is a tension coil spring 39 which is fastened at one end to the bottom of the table 11, and at its other end to the portion 30.

To interconnect the tool 16 with the constantly rotating shaft 20, a clutch is provided which is positioned in a cylindrical casing member 41 that is received in the hub 28 of the bracket 27 and secured therein by a set screw 42. The casing 41 is open at the bottom thereof, but is closed at its top end except that it is provided with an opening 43 for the reception of the spindle 20. Positioned in the closed end 44 of the casing is a ball bearing 45 concentric with the spindle 20. Formed on the end of the latter is a male clutch element 46 which is of frusto conical form and is made with a central opening 47 for screw threaded engagement with the end of the spindle 20. The element 46 may be made wholly of metal or it can be made with a core of metal surrounded with a layer of fiber. In either case, the surface 48 of the member 46 is formed with a plurality of longitudinally extending grooves 49 which are comparatively slight in depth. The depth of these grooves will depend in a large measure upon the nature of the coacting parts of the clutch, and in the invention as herein constructed, they may not be more than one sixty-fourth of an inch in depth.

Coacting with the male member 46 is a female clutch member 50 which is fitted for free sliding movement in a vertical direction in the casing 41. The said member 50 terminates at its lower end in a shank 51 of reduced diameter, the latter being in alinement with the spindle 20. To secure the tool 16 to the shank 51, the former may be made with an undercut portion 52 that is received in a central opening 53 in the shank and locked therein by a set screw 54. To retain the female member in the casing 41 a sleeve 55 is inserted into the lower end of said casing and locked therein by a set screw 56.

The member 50 is provided with a lining 56 that is made of a frictional material, as, for example, asbestos. The liner 56 has an internal surface 58 of frusto conical form to receive the male clutch member 46. The asbestos of which the liner 56 is made is of compact and cohesive nature and is secured within the member 50 in any feasible manner by means of an adhesive, or the like. In order to make the engagement as strong as possible and at the same time permit easy replacement of the lining 56, the member 50 is formed with a plurality of openings or notches 59 so positioned that a portion of the asbestos will be forced thereinto when the element 46 is pressed into co-operation with the asbestos. For simplicity in manufacture, the openings 59 are preferably formed from the tip edge or rim 60 of the wall of the member 50.

Tending to separate the members 46 and 50 of the clutch is a central expansion coil spring 61, the ends of which are received in the central alined openings or bores 62 and 63 in the respective clutch members. Accordingly the liner 56 is made with a hole 64 for the passage of the spring 61. The spring 61 is effective to retain the clutch member 46 at the top of the casing 41 and also to move the member 50 downward to seat on the sleeve 55. The seat referred to may be of conical form as shown at 65. For proper lubrication of the device the spindle 20 may be formed with a plurality of oil grooves 66 extending in any desired direction thereon. A housing for the chain 15 may also be provided.

The operation of the device will now be clearly apparent. With the spindle 20 turning constantly, the clutch is normally disengaged so that the tool 16 is not turned. However, on depressing the pedal 34, the bracket 26 is caused to move downward, bringing the screw driver into engagement with the screw 29. An axial pressure is thus exerted on the member 50 of the clutch, causing the same to move in an upward direction with respect to the member 46 and against the force of the spring 61, thus causing the clutch to grip and transmit rotation to the screw driver 16. On releasing the pedal 34, the spring 39 automatically moves the bracket 26 upward, the clutch disengages, and the screw driver ceases to rotate.

It will thus be seen that I have provided a device which fulfills the several objects of the invention, and is well adapted to meet the conditions of practical use.

I claim:

A clutch of the character described, having engaging male and female cone members, the female member having an asbestos lining secured therein with cement, and having openings at the edge thereof to permit the asbestos to be pressed thereinto and strongly retained against movement, the male member having a plurality of longitudinal shallow grooves to strongly grip the asbestos lining when the said members are in engagement.

In testimony whereof I affix my signature.

JOSHUA C. EDGECUMBE.